United States Patent
Sader

(10) Patent No.: US 10,150,436 B2
(45) Date of Patent: Dec. 11, 2018

(54) ATTACHMENT FOR FIXING TO A VEHICLE BODY

(71) Applicant: Magna Exteriors GmbH, Sailauf (DE)

(72) Inventor: Joerg Sader, Fellbach (DE)

(73) Assignee: MAGNA Exteriors GmbH, Sailauf (DE)

( * ) Notice: Subject to any disclaimer, the term of this patent is extended or adjusted under 35 U.S.C. 154(b) by 100 days.

(21) Appl. No.: 15/598,592

(22) Filed: May 18, 2017

(65) Prior Publication Data
US 2017/0341608 A1 Nov. 30, 2017

(30) Foreign Application Priority Data
May 27, 2016 (DE) .......................... 10 2016 209 208

(51) Int. Cl.
| B60R 19/04 | (2006.01) |
| B60R 19/02 | (2006.01) |
| B60R 19/18 | (2006.01) |
| B60R 19/24 | (2006.01) |

(52) U.S. Cl.
CPC ............ B60R 19/023 (2013.01); B60R 19/18 (2013.01); *B60R 2019/1886* (2013.01); *B60R 2019/247* (2013.01)

(58) Field of Classification Search
CPC ......... A01B 35/20; A01B 43/00; A01B 49/02; B67D 9/02; E01C 11/126; H01L 2924/00014; H01L 2924/00; H05K 13/0417; C07C 5/2775; F16D 31/02
USPC ............................. 296/29, 1.08; 293/155, 154
See application file for complete search history.

(56) References Cited

U.S. PATENT DOCUMENTS

| 4,875,728 | A | * | 10/1989 | Copp | B60R 19/24 293/126 |
| 5,169,189 | A | * | 12/1992 | Haberle | B60R 19/02 293/102 |
| 5,560,662 | A | * | 10/1996 | Apgar, Jr. | B60R 19/18 293/108 |
| 6,322,115 | B1 | * | 11/2001 | Devilliers | B60R 19/18 293/120 |
| 6,334,638 | B1 | * | 1/2002 | Yamamuro | B60R 19/34 293/132 |
| D542,939 | S | * | 5/2007 | Neuhofer, Jr. | B29C 66/1122 D25/135 |
| 8,528,285 | B2 | * | 9/2013 | Kornfalt | E04F 19/062 52/395 |

(Continued)

FOREIGN PATENT DOCUMENTS

DE 202010013931 U1 1/2012

*Primary Examiner* — Kiran B Patel
(74) *Attorney, Agent, or Firm* — Jordan IP Law, LLC; Todd A. Vaughn

(57) ABSTRACT

An attachment for connection to a body of a motor vehicle. The attachment having a cover member composed of plastic, a reinforcement member composed of plastic, and a stiffening member composed of metal inserted therebetween. The reinforcement member is fastened to the cover member such that at least one of the reinforcement member and the cover member at least partially engage around the stiffening member at least sectionally. As a result, the stiffening member is surrounded at least sectionally on at least three sides by the cover member and the reinforcement member. In this way, the stiffening member is thereby fixed in a locationally and positionally accurate manner.

12 Claims, 3 Drawing Sheets

(56) References Cited

U.S. PATENT DOCUMENTS

| | | | | |
|---|---|---|---|---|
| 8,777,468 B2* | 7/2014 | Suehiro | ............... | B60Q 1/0441 |
| | | | | 362/505 |
| 9,694,775 B2* | 7/2017 | Kaneko | ................... | B60R 19/34 |
| 9,950,747 B2* | 4/2018 | Mashio | ............... | B62D 27/023 |
| 2009/0072429 A1* | 3/2009 | Ashton | ............... | B29C 66/1122 |
| | | | | 264/152 |
| 2011/0080013 A1* | 4/2011 | Ruder | ..................... | B60R 19/24 |
| | | | | 293/155 |
| 2012/0217763 A1* | 8/2012 | Likar | ..................... | B60R 19/24 |
| | | | | 293/155 |
| 2018/0093710 A1* | 4/2018 | Kellner | ............... | B62D 21/152 |

\* cited by examiner

ATTACHMENT FOR FIXING TO A VEHICLE BODY

CROSS-REFERENCE TO RELATED APPLICATIONS

The present application claims priority under 35 U.S.C. § 119 to German Patent Publication DE 102016209208.1 (filed on May 27, 2016), which is hereby incorporated by reference in its entirety.

TECHNICAL FIELD

Embodiments relate to an attachment for fixing to a body of a motor vehicle, having a cover member composed of plastic, a reinforcement member likewise composed of plastic and a stiffening member composed of metal inserted therebetween. The reinforcement member is fastened to the cover member such that the reinforcement member and/or the cover member at least partially engage around the stiffening member arranged between the cover member and the reinforcement member at least sectionally. As a result, the stiffening member is surrounded at least sectionally on at least three sides by the cover member and the reinforcement member, which stiffening member is surrounded at least sectionally on three sides by the engagement around and the arrangement between the cover member and the reinforcement member and is thereby fixed in a locationally and positionally accurate manner.

Embodiments relate to an attachment for fixing to a motor vehicle body, such as, for example, a bumper or a bumper cover member, having a cover member composed of plastic and a stiffening member inserted therein.

BACKGROUND

Known attachments for fixing to a body part of a vehicle referred to in short as the vehicle body, such as bumper cover members, for example, usually comprise in addition to a plastics cover member both a fastening part made from a plastics material that may be fastened to the vehicle body, which fastening part is in contact with the cover member in the assembly state fixed to the vehicle body, and also a reinforcement member which is provided to reinforce a fastening connection providing the fixing. The reinforcement member means that the fastening force supplied by the fastening part provided in each case for fixing the cover member to the vehicle body, such as a screw force, for example, may be distributed over a larger area. In this way, an excessive disadvantageous flow of the plastics material, both of the fastening part and also of the cover member, is effectively avoided.

It is known in the art for the reinforcement members to be configured in the form of a metal rail or from a rigid plastic that is resistant to deformation, even under load. To make assembly easier, it is likewise known in the art for the reinforcement member to be attached to the respective fastening part before the attachment is fixed to the vehicle body, for example held by expanding rivets and/or pre-locked, so that the fastening of the cover member to the vehicle body also includes the assembly step of attaching and/or pre-locking the reinforcement member to the fastening part via additional locking means provided therefor, such as the aforementioned expanding rivets. Alternatively, the reinforcement member may be attached by bonding, clipping or welding.

DE 20 2010 013 931 U1 discloses an attachment configured as a bumper cover member for fixing to a body of a motor vehicle. In addition to the cover member, said attachment comprises a fastening part and a reinforcement member. The fastening part and the reinforcement member each have at least one fastening opening. The attachment may be fastened to the body part via at least one fastening device which extends continuously through the fastening opening of the reinforcement member, the fastening opening of the fastening part and a fastening opening of the cover member. The reinforcement member is provided to reinforce the fastening connection providing the fixing which is referred to in short as the fastening. The fastening part has at least one bearing surface on which the reinforcement member rests at least sectionally in the fastening state. In the assembly state, the fastening part is in contact with the cover member. In order to hold the reinforcement member on the fastening part, a hook-shaped suspension device and at least one catch member are provided. The suspension device and the catch member are moulded onto the fastening part and extend from the bearing surface. The suspension device has a wall spaced apart from the bearing surface. A side of the wall facing the bearing surface extends up to a stop region of the suspension device moulded onto the bearing surface.

The reinforcement member has a suspension opening through which the suspension device can pass for suspension in the suspension device, said suspension opening being delimited by an opening edge. In a suspension position of the reinforcement member, a bearing portion of the opening edge lies on the stop region. In order to adopt the suspension position, the bearing portion is movable between the wall side and the bearing surface in the direction of the stop region. At least one catch opening is provided on the reinforcement member. By moving the bearing portion between the wall side and the stop surface in the direction of the stop region, the catch opening may be pushed via the catch member. The catch member may be received in the catch opening in a locking manner as soon as the suspension position has been reached.

The disadvantage of this is the time-consuming preparation of the connection of the fastening part and the reinforcement member, inadequate alignment of the reinforcement member in respect of the cover member and therefore only limited compliance with the small gap dimensions required in the assembly state in order to give the impression of quality, combined with a high scrap rate associated with a high level of expenditure on subsequent adjustment.

SUMMARY

The problem addressed by embodiments is that of specifying an attachment for fixing to a body of a motor vehicle, having a cover member composed of plastic and a stiffening member, which is to be supplied cost-effectively and easily mounted in compliance with precise gap sizes and, moreover, is temperature-stable.

The problem is solved by the features of the independent claim(s). Advantageous embodiments are reproduced in the claims, in the drawings, and also in the following description, including that relating to the drawings.

Embodiments relate to an attachment for fixing to a body of a motor vehicle, such as a bumper or a bumper cover member, for example, having a cover member composed of plastic, a reinforcement member likewise composed of plastic and a stiffening member composed of metal inserted therebetween.

The stiffening member, composed of metal, is arranged between the cover member and the reinforcement member in this case.

The attachment is characterized in that the reinforcement member is fastened to the cover member, wherein it engages around the metal stiffening member arranged between the cover member and the reinforcement member at least partially, as a result of which the metal stiffening member is surrounded at least sectionally on at least three sides by the cover member and the plastic stiffening member arranged thereon.

The attachment is characterized, for example, by a pre-fixing of the plastic reinforcement member to the plastic cover member with at least sectional engagement around a metal stiffening member arranged between the reinforcement member and the cover member. The stiffening member is to be surrounded by the engagement around and the arrangement between the two plastics parts (the cover member and the reinforcement member) at least sectionally on three sides by plastics parts and thereby fixed in a locationally and positionally accurate manner.

Embodiments not only makes a locationally and positionally accurate fixing possible but, insofar as necessary, the stiffening member may be received in a floating manner, so that tolerance fluctuations in the joining process and/or, for example, body shell work tolerances may be balanced out.

The pre-fixing of the reinforcement member to the cover member with the stiffening member arranged between the reinforcement member and the cover member may be produced via a bonded connection, a catch connection, a welded connection or a combination thereof.

The cover member may exhibit a flange portion. A plastic reinforcement member supplying a side guide of the cover member, for example, may be arranged on the flange portion. It may, for example, be fastened to the flange portion by a bonded connection, a catch connection or a welded connection. Embodiments, however, are not limited. The metal stiffening member is inserted between the cover member and the reinforcement member. In this case it is surrounded on at least three sides by the parts of the cover member and of the reinforcement member composed of plastic and thereby fixed in a locationally and positionally accurate manner.

Embodiments may be realized by an attachment fitted with a cover member composed of plastic, a reinforcement member likewise composed of plastic and a stiffening member composed of metal arranged therebetween, said attachment being characterized by a pre-fixing of the reinforcement member to the cover member with a positive-locking fixing of the stiffening member arranged between the member and the cover member produced by an at least sectional engagement around it.

The attachment may, alternatively or additionally, exhibit individual features or a combination of several features described herein in connection with the state of the art and/or in one or a plurality of documents mentioned on the state of the art and/or in the following description relating to the exemplary embodiments depicted in the drawings.

Additional advantages in respect of the state of the art which go beyond the complete solution of the aforementioned problem and/or beyond the advantages mentioned in the following description in relation to the individual features are as follows:

(1) low production costs associated with a low scrap rate which has cost-reducing implications for production costs;

(2) simplification of the assembly stages. For example, pre-assembled attachments, for prefabrication, for example, be used in a welding plant, for example;

(3) use of a material combination of metal and plastic without limitation in respect of stiffness and tolerance fluctuations;

(4) the at least sectional anti-corrosion protection on at least three sides of the metal stiffening member, in that this is surrounded at least sectionally on three sides by plastic parts, such as, for example, by a flange portion of the cover member;

(5) a reliable frictional connection through the sandwich embedding of the metal stiffening member between the plastic cover member and the likewise plastic reinforcement member; and (6) a decrease in the pre-stressing force customary with a rising temperature through flowing of the plastic is substantially reduced by the embedded metal stiffening member.

DRAWINGS

Embodiments are explained in greater detail below with the help of exemplary embodiments depicted in the drawing. The size ratios of the individual members relative to one another in the figures do not always reflect the actual size ratios, as some forms are simplified and other forms are enlarged compared with other members for clearer illustration purposes. Identical reference numbers are used for identical members or members with the same action in the invention. In addition, in the interests of providing an overview, only reference numbers which are necessary for the description of the figure are depicted in the individual figures in each case. The embodiments shown only represent examples of how the invention may be configured and do not represent a final limitation. The figures show as schematic representations:

DESCRIPTION

Figure 1:
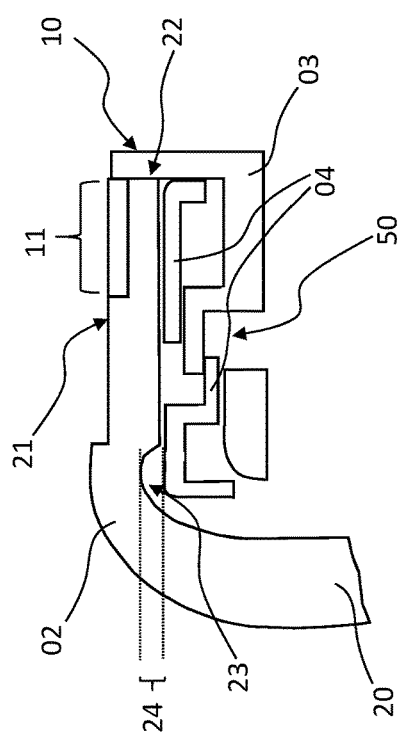
FIG. 1 illustrates a first detail view of an embedding of a stiffening member between parts composed of plastic of a cover member and of a reinforcement member of an attachment in a first section, in accordance with embodiments.
Figure 2:
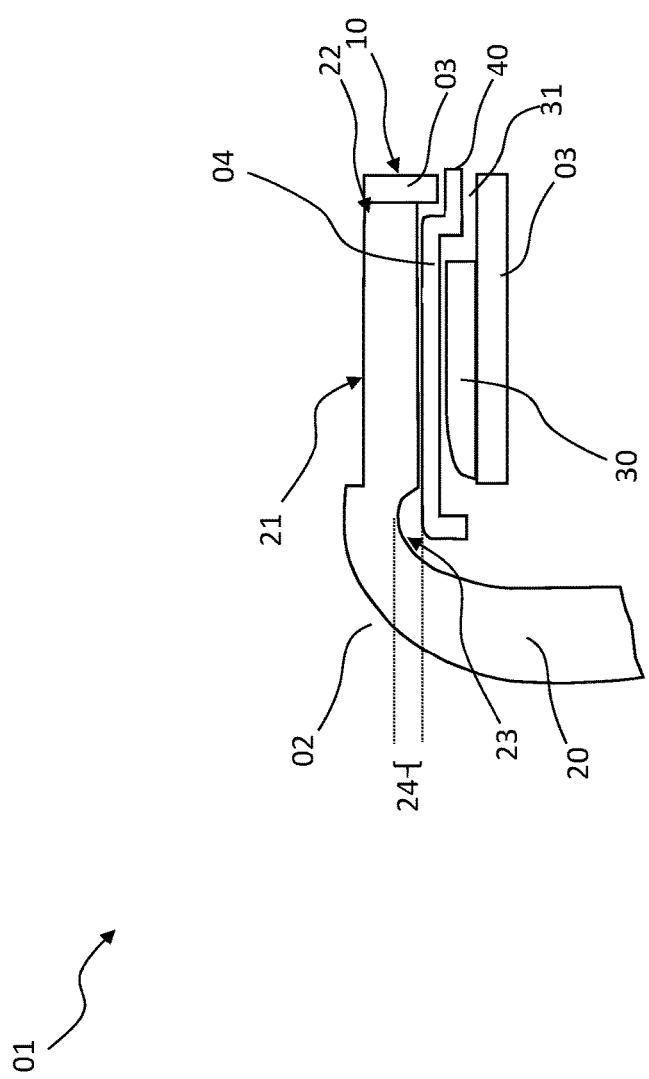
FIG. 2 illustrates a second detail view of an embedding of a stiffening member between the parts composed of plastic of the cover member and of the reinforcement member of an attachment in a second section.
Figure 3:
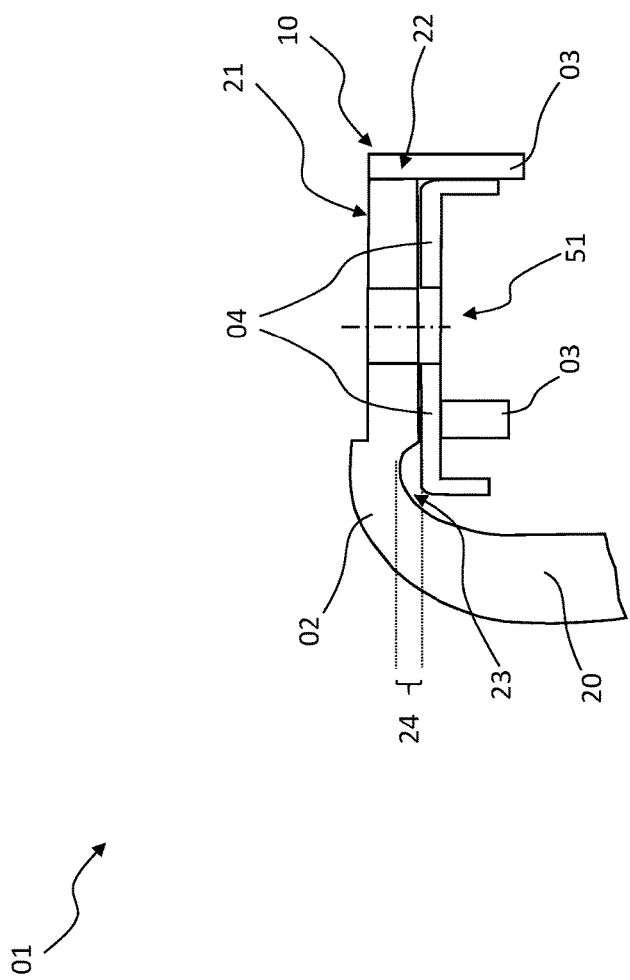
FIG. 3 illustrates a third detail view of an embedding of a stiffening member between the parts composed of plastic of the cover member and of the reinforcement member of an attachment in a third section.

As illustrated in FIGS. 1-3, depicts wholly or in part, an attachment 01 for fixing to a body of a motor vehicle body, such as, for example, a bumper or a bumper cover member, includes a cover member 02 composed of plastic, a reinforcement member 03 composed of plastic, and stiffening member(s) 04 composed of metal, and which is introduced between the cover member 02 and the reinforcement member 03.

The reinforcement member 03 is fastened to the cover member with an at least partial engagement around the metal stiffening member 04 arranged between the cover member 02 and the reinforcement member 03. The stiffening member 04 arranged between the cover member 02 and the reinforcement member 03 is at least partially enclosed by the cover member 02 and/or the reinforcement member 03, as a result of which the stiffening member 04 is surrounded at least sectionally on at least three sides by the cover member 02 and the reinforcement member 03 fastened thereto.

For the attachment 01, the reinforcement member 03 is to be fastened to the cover member 02, wherein the reinforcement member 03 and/or the cover member 02 at least partially engage around the stiffening member 04 arranged between the cover member 02 and the reinforcement member 03 at least sectionally. In this way, the stiffening member 04 is surrounded at least sectionally on at least three sides by the cover member 02 and the reinforcement member 03 fastened thereto and arranged in this way. Moreover, the stiffening member 04 is surrounded by the at least sectional, at least partial engagement around, and the arrangement between the two plastics parts (the cover member 02 and the reinforcement member 03) at least sectionally on three sides by plastics parts in an at least partially positively locking manner and thereby fixed with anti-corrosion protection in a locationally and positionally accurate manner.

In accordance with embodiments, the reinforcement member 03 may be configured to supply a side guide of the cover member 02. Alternatively or in addition, the reinforcement member 03 may act as, or contribute to a fastening of the attachment 01 to the vehicle body. For example, fastening architecture, such as screws or simple projections, may extend through the cover member 02 and the stiffening member 04 as far as the reinforcement member 03 for connection to said reinforcement member 03. Such connection may occur, for example, by screwing in, extending through or frictional connection, producible by laser welding, for example, in which the fastening architecture or the reinforcement member 03 are at least largely transparent to the wavelength of the electromagnetic radiation coming from a laser light source and the correspondingly opposite component. In this way, for example, the reinforcement member 03 or fastening architecture, exhibits a high degree of absorption. In this way, a contact point that cannot be seen from the outside, for example, between the reinforcement member 03 and fastening architecture likewise composed of plastic, may be fused and connected in a substance-bonded manner by subsequent cooling.

As illustrated in FIG. 3, alternatively or in addition, the reinforcement member 03 may act as or contribute to a fastening of the attachment 01 to the body of the motor vehicle, in that it has itself, in the same way as the cover member 02 and the stiffening member 04, fastening openings 51 extending through the attachment 01 arranged in a substantially identical manner. Fastening openings 51 of this kind, are to extend through the stiffening member 03, the reinforcement member 04 and the cover member 02, viewed from the inside out.

In order to fix the attachment 01 to a body of a motor vehicle, fastening architecture may therefore be provided which project or extend through the fastening openings 51. Fastening architecture suitable for this purpose, apart from screws which fix the attachment 01 to the body of the motor vehicle by screwing into a counterpart, for example, a nut, include rivets and bolts, but also pins that may be deformed for fixing, plug-in/rotate connectors. Embodiments, however, are not limited thereto.

An embodiment of the reinforcement member 03 which, alternatively or additionally, acts as or contributes to a fastening of the attachment 01 to the motor vehicle body, may provide fastening spigots or threaded portions arranged on said reinforcement member 03 and extending through fastening openings arranged in a substantially identical manner in the stiffening member 04 and in the cover member 02, which fastening spigots or threaded portions then extend through corresponding assembly openings on the vehicle body where they act as a fastening, for example through deformation, positive-locking or substance-bonded connection to a counterpart, etc.

The reinforcement member 03 is to be fastened to the cover member 02 along at least one portion, while engaging around the metal stiffening member 04 arranged between the cover member 02 and the reinforcement member 03, from an edge 10 facing away from a remaining section 20 of the cover member 02. At least from this edge 10, the stiffening member 04 is thereby protected by the reinforcement member 03 and/or the cover member 02. The reinforcement member 03 is to engage around the cover member 02 at least sectionally from the edge 10, as shown in FIG. 1.

In accordance with embodiments, the reinforcement member 03 may, for example, be fastened to the cover member 02 via a bonded connection, a catch connection, a welded connection or a combination thereof. The reinforcement member 03 may be pre-fixed to the cover member 02 by engaging around at least the stiffening member 04 arranged between the reinforcement member 03 and the cover member 02, at least sectionally, such as around both the stiffening member 04 arranged between the reinforcement member 03 and the cover member 02 and part of the cover member 02.

The attachment 01 is, for example, additionally characterized by a pre-fixing of the reinforcement member 03 to the cover member 02 by engaging at least sectionally around the stiffening member 04 arranged between the reinforcement member 03 and the cover member 02. The stiffening member is to be surrounded through engagement around and arrangement between the two plastic parts (the cover member 02 and the reinforcement member 03) connected to one another by pre-fixing prior to the fixing of the attachment 01 to the motor vehicle body at least sectionally on three sides by the plastics parts. It is thereby fixed in a locationally and positionally accurate manner.

In this way, handling the attachment 01, for example, during storage and up to assembly and subsequently during assembly, when it is fixed to the vehicle body, is made substantially easier. In this way, time-consuming assembly steps required in the state of the art during the fixing of the attachment 01 to the vehicle body may be dispensed with. Moreover, the pre-fixing of the reinforcement member 03 to the cover member 02 by locationally and positionally accurate fixing of the stiffening member 04 between the reinforcement member 03 and the cover member 02 is made substantially easier on account of free accessibility from all sides, unlike an introduction provided for in the state of the art of a stiffening member arranged on a fastening part only during the fixing of an attachment to a body of a motor vehicle. As a result, this is less time-consuming and therefore more cost-effective. Storage is also made easier and therefore more cost-effective by the pre-fixing, as now only the completely prefabricated attachment 01 need be kept in stock and no longer, as in the state of the art, at least one cover member and a fastening part only required during fixing with a stiffening member 04 arranged thereon.

As illustrated in FIG. 1, the stiffening member 04 may be pre-fixed to the reinforcement member 03 by engaging around part of the cover member 02. For example, the pre-fixing of the reinforcement member 03 to the cover member 02 with the stiffening member 04 arranged between the reinforcement member 03 and the cover member 02 may be produced exclusively or with the additional assistance of a bonded connection, a welded connection or a combination thereof.

As depicted in FIG. 1, the stiffening member 04 may be held on the reinforcement member 03 on a side facing the cover member 02 through a rear engagement 50 in the form of a mutual interlocking and/or a catch connection, for example, even before the stiffening member 03 is pre-fixed to the cover member. In this way, the pre-fixing may be made easier and accompanied by a further cost saving.

Particularly, the cover member 02 may have a flange portion 21. The reinforcement member 03 may be fastened to the flange portion 21. The flange portion 21 may to projects in the direction of the edge 10 of the remaining section 20 of the cover member 02. The flange portion 21 therefore changes on the one hand into the base section 20 of the cover member 02, whereas the flange section 21 leading to the edge 10 ends with a front face 22. The reinforcement member 03 and the stiffening member 04 are to be arranged on the side of the cover member 02 on which the flange portion 21 forms the smaller angle with a base section 20 of the cover member 02.

The fastening of the reinforcement member 03 to the cover member 02 with at least partial engagement around the stiffening member 04 arranged between the cover member 02 and the reinforcement member 03 by the reinforcement member 03 and/or the cover member 02 is to be provided along a front face 22 of the flange portion 21 facing away from a remaining section 20 of the cover member 02, for example sectionally forming the edge 10 and/or sectionally running parallel to the edge 10 and/or running along the edge 10.

On the attachment 01, particularly on the flange section 21, positioning architecture for alignment with respect to the motor vehicle body may be provided in addition, such as, for example, projections and/or depressions. In this case, individual or all positioning architecture may be provided on the reinforcement member 03 and be accessible from the flange portion 21 through corresponding identical positioning openings provided in the stiffening member 04 and in the cover member 02 and/or project up or out on the side of the flange portion 21 facing away from the stiffening member 04 and the reinforcement member 03.

As illustrated in FIG. 2, the stiffening member 04 may be positioned, clamped for example, at least partially by ribs 30 which are to project on the reinforcement member 03 between the reinforcement member 03 and the cover member 02, in particular, between the reinforcement member 03 and the flange portion 21 of the cover member 02. Moreover, a rib 30 of this kind may act as a positive-locking fixing and/or pre-fixing of the stiffening member 04, for example, in that the stiffening member 04 exhibits a lug 40 projecting into or through a peripheral opening 31 in the reinforcement member 03. At the transition between the remaining section 20 and the flange portion 21 of the cover member 02, a channel 23 may be provided, for example, continuously or sectionally. This may be configured with a constant depth 24.

As already mentioned, the reinforcement member 03 is fastened, for example pre-fixed, to the cover member 02, particularly preferably with at least sectional engagement around both the stiffening member 04 arranged between the reinforcement member 03 and the cover member 02, and also around part of the cover member 02. That part of the cover member 02 which the reinforcement member 03 in this case sectionally engages around at least partially may be the flange portion 21 of the cover member 02, as illustrated in FIG. 1. The reinforcement member 03 and the flange portion 21 partially overlap in this case in an engagement region 11. The flange portion 21 may exhibit substantially one-half of the wall thickness in the engagement region 11 compared with outside the engagement region 11. The reinforcement member 03 in the engagement region 11 may likewise exhibit a wall thickness which substantially corresponds to one-half of the wall thickness of the flange portion 21 outside the engagement region 11.

Embodiments may be realized by an attachment 01 fitted with a cover member 02 composed of plastic, a reinforcement member 03 likewise composed of plastic and a stiffening member 04 arranged therebetween composed of metal, which attachment 01 is characterized by a pre-fixing of the reinforcement member 03 to the cover member 02, particularly a flange portion 21 of the cover member 02, with a positive-locking fixing produced by an at least sectional engagement around the stiffening member 04 arranged between the reinforcement member 03 and the cover member 02.

The combination of a stiffening counter-surface, in this case the stiffening member 04, to the vehicle body, for example, to a wing, and also a stiffening of a side guide, for example, via a stiffening member 03, may be separately adapted to the respective conditions in the case of the attachment 01. The pre-fixing of the reinforcement member 03 and the stiffening member 04 to the cover member 02 to produce the completely prefabricated attachment 01 may take place in a pre-assembly stage. Hence, no subsequent introduction of the stiffening member 04, for example following a welding process, in which, for example, a reinforcement member is fastened to the cover member in the state of the art, is necessary. Unlike in a stiffening member composed of plastic, a desired pre-stressing may also be introduced to the stiffening member 04 composed of metal. In this way, a frequently occurring disadvantage of the state of the art involving a small detail in the join between the cover member of the attachment and the motor vehicle body may be counteracted.

Furthermore, it is possible, from a certain force level, for a desired detachment of the two components to be provided for. This prevents an unwanted deformation of the cover member which may be brought about by traction during the joining process, for example during the insertion of screws for the vehicle body. A further disadvantage of the state of the art, the use of expensive, more rigid plastics in order to achieve integration with a stiffening member composed of metal, may be avoided in accordance with embodiments.

Embodiments are not limited by the description with the help of the exemplary embodiments. Instead, the embodiments may comprise each new feature and also each combination of features, which particularly includes each combination of features in the claims, even if this feature or this combination is not itself explicitly indicated in the claims or exemplary embodiments.

Embodiments are commercially applicable, particularly in the area of the production of attachments for vehicles, in particular motor vehicles.

Embodiments have been described with reference to a preferred embodiment. Any person skilled in the art will be able to envisage, however, that modifications or changes may be made to the invention without thereby departing from the scope of protection offered by the following claims.

The term "coupled," "attached," or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

This written description uses examples to disclose the invention, including the preferred embodiments, and also to enable any person skilled in the art to practice the invention, including making and using any devices or systems and performing any incorporated methods. The patentable scope of embodiments is defined by the claims, and may include other examples that occur to those skilled in the art. Such other examples are intended to be within the scope of the claims if they have structural members that do not differ from the literal language of the claims, or if they include equivalent structural members with insubstantial differences from the literal languages of the claims. Aspects from the various embodiments described, as well as other known equivalents for each such aspects, may be mixed and matched by one of ordinary skill in the art to construct additional embodiments and techniques in accordance with principles of this application.

LIST OF REFERENCE NUMERALS

01 Attachment
02 Cover member
03 Reinforcement member
04 Stiffening member
10 Edge
11 Engagement region
20 Remaining section
21 Flange portion
22 Front face
23 Recess
24 Depth
30 Rib
31 Opening
40 Lug
50 Rear engagement
51 Fastening opening

What is claimed is:

1. An attachment for a motor vehicle, the attachment comprising:
a cover member composed of plastic;
a reinforcement member, composed of plastic, and fastened to the cover member; and
a stiffening member, composed of metal, to be arranged between the cover member and the reinforcement member,
wherein at least one of the reinforcement member and the cover member are to at least partially engage the stiffening member such that the stiffening member is surrounded on at least three sides, thereby fixing the position of the stiffening member.

2. The attachment of claim 1, wherein the reinforcement member is pre-fixed to the cover member by engaging the stiffening member.

3. The attachment of claim 1, wherein the reinforcement member is fastened to the cover member via one of a bonded connection, a catch connection, a welded connection, or a combination thereof.

4. The attachment of claim 1, wherein the reinforcement member defines a side guide for the cover member.

5. The attachment of claim 1, further comprising fastening openings to extend through the cover member, the stiffening member, and the reinforcement member.

6. The attachment of claim 1, wherein the cover member comprises a base section and a flange section to extend from the base section.

7. The attachment of claim 6, wherein the reinforcement member is fastened to the flange section.

8. The attachment of claim 6, wherein the reinforcement member and the stiffening member are arranged on a side of the cover member on which the flange portion forms an angle with the base section.

9. The attachment of claim 6, further comprising positioning architecture for alignment with respect to a body of the motor vehicle.

10. The attachment of claim 9, wherein the positioning architecture is provided on the reinforcement member.

11. The attachment of claim 10, wherein the positioning architecture is accessible from the flange section through corresponding positioning openings provided in the stiffening member and in the cover member.

12. The attachment of claim 10, wherein the positioning architecture is to project from a side of the flange section facing away from the stiffening member and the reinforcement member.

* * * * *